United States Patent

Reisner et al.

[15] 3,681,350

[45] Aug. 1, 1972

[54] 2,3-DIHYDRO-9H-ISOXAZOLO(3,2-B) QUINAZOLIN-9-ONES

[72] Inventors: David B. Reisner, Hightstown; Bernard J. Ludwig, North Brunswick; Frank M. Berger, Princeton, all of N.J.

[73] Assignee: Carter-Wallace, Inc., New York, N.Y.

[22] Filed: Oct. 8, 1970

[21] Appl. No.: 79,311

[52] U.S. Cl. ....260/251 A, 260/256.5 R, 260/307 A, 424/251
[51] Int. Cl. ............................................C07d 51/48
[58] Field of Search......260/251 A, 251 QA, 256.5 R

[56] References Cited

UNITED STATES PATENTS 3,280,117  10/1966  Griot..........................260/243

Primary Examiner—Alex Mazel
Assistant Examiner—R. V. Rush
Attorney—Kevin B. Clark

[57] ABSTRACT

Chemical compounds of the formula:

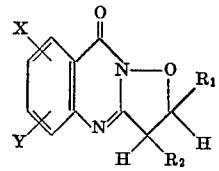

in which X and Y, which may be the same or different, each represent a member selected from the group consisting of hydrogen, hydroxy, halogen, lower alkyl, lower alkoxy or sulfonamido and $R_1$ and $R_2$, which may be the same or different, represent hydrogen or lower alkyl. Said compounds have valuable anti-inflammatory and antipyretic as well as diuretic activity in warm-blooded animals.

19 Claims, No Drawings

2,3-DIHYDRO-9H(3,2-B)QUINAZOLIN-9-ONES

The present invention relates to novel quinazolinone compounds. More particularly the invention relates to 2,3-dihydro-9H-isoxazolo(3,2-b)quinazolin-9-one as well as substituted 2,3-dihydro-9H-isoxazolo(3,2-b)quinazolin-9-ones which possess useful pharmacological properties.

The compounds of this invention possess valuable therapeutic activities which render them useful as antiinflammatory, antipyretic and diuretic agents. In addition, the products of this invention also possess significant antiserotonin and antibradykinin activities and are capable of prolonging the duration of hippocampal seizures in standard laboratory animals.

It is accordingly an object of the present invention to produce the novel compound 2,3-dihydro-9H-isoxazolo (3,2-b)quinazolin-9-one as well as novel substituted 2,3-dihydro-9H-isoxazolo(3,2-b)quinazolin-9-ones which are useful pharmacologically because of their aforesaid types of activity. Other objects of the invention will be apparent to one skilled in the art, and still other objects will become apparent hereinafter.

The compounds of the present invention are represented by the following general formula:

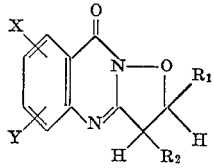

wherein X and Y, which may be the same or different, each represent a member selected from the group consisting of hydrogen, hydroxy, halogen, lower alkyl, lower alkoxy and sulfonamido and $R_1$ and $R_2$, which may be the same or different, represent hydrogen or lower alkyl. As used throughout the instant specification and the appended claims, the terms "lower alkyl" and "lower alkoxy" shall mean alkyl and alkoxy radicals containing from 1 to 6 carbon atoms.

The compounds of the present invention can be prepared in accordance with any one of the following methods:

The following methods of preparation and examples are given by way of illustration only and are in no event to be construed as limiting.

METHOD A

An isatoic anhydride, prepared from an anthranilic acid and phosgene, is allowed to react with the sodium or potassium salt of an appropriate 3-isoxazolidinone, prepared according to known methods, in water or an organic solvent such as dimethylformamide, pyridine, acetonitrile, xylene, chloroform or a mixture of water and an organic solvent, such as described above, according to the following reaction scheme:

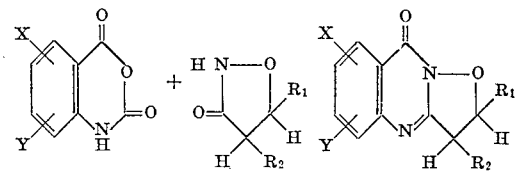

wherein X, Y, $R_1$ and $R_2$ are as hereinbefore defined.

METHOD B

An appropriate 3-isoxazolidinone, prepared from an acid halide of a 3-halogenoalkanoic acid and hydroxylamine in the presence of alkali in water, is reacted in situ with an appropriate isatoic anhydride with or without the addition of an organic solvent, such as employed in METHOD A, according to a reaction scheme similar to that of METHOD A.

METHOD C

An ester of a o-(3-chloropropionamido)benzoic acid, such as prepared from an ester of anthranilic acid and an acid halide of a 3-chloroalkanoic acid, is reacted with hydroxylamine in the presence of alkali in water and/or a lower alkyl alcohol according to the following reaction scheme:

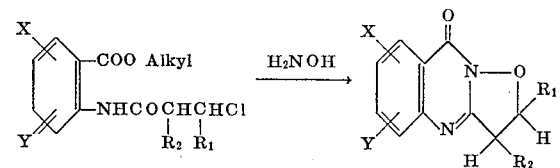

wherein X, Y, $R_1$ and $R_2$ are as hereinbefore defined.

METHOD D

An o-aminobenzohydroxamic acid is reacted with an acid halide of a 3-halogenoalkanoic acid in the presence of alkali in water and/or an alcohol according to the following reaction scheme:

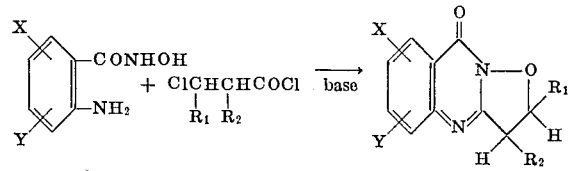

wherein X, Y, $R_1$ and $R_2$ are as hereinbefore defined.

The invention is further illustrated by the following examples.

EXAMPLE I

Preparation of 2,3-dihydro-9H-isoxazolo(3,2-b) quinazolin-9-one

Following the procedure set forth in METHOD A, a solution of 10 grams of the sodium salt of 3-isoxazolidinone in 200 ml. of water was adjusted to pH 8 with hydrochloric acid and 8.1 grams of isatoic anhydride was added portionwise. The mixture was stirred overnight at room temperature and then extracted with three 100 ml. portions of chloroform. The chloroform solutions were combined, dried, and evaporated to dryness. The crude product (6.4 grams) was recrystallized from xylene giving 4.5 grams of purified 2,3-dihydro-9H-isoxazolo(3,2-b)quinazolin- 9-one. isoxazolo(3,2-b)quinazolin-9-one.

EXAMPLE II 2,3-Dihydro-9H-isoxazolo(3,2-b)quinazolin-9-one was prepared using the procedure of METHOD C above A. To a cooled solution of 12 grams of methyl anthranilate in pyridine, 10.1 grams of 3-chloropropionyl chloride was added dropwise. The mixture was stirred for two hours with cooling and then evaporated under reduced pressure. The oil was dissolved in chloroform, washed with saturated sodium chloride solution, dried, and evaporated to dryness under reduced pressure. The oil that crystallized on standing was recrystallized first from ethyl ether and then from isopropyl ether. The product, methyl o-(3-chloropropionamido)benzoate melted at 87°–90° C. and gave the following analysis:

|  | C | H | Cl | N |
|---|---|---|---|---|
| Calculated for $C_{11}H_{12}ClNO_3$: | 54.67 | 5.01 | 14.67 | 5.80 |
| Found: | 54.86 | 5.08 | 14.71 | 5.78 |

B. To a mixture of ice and water were added 1.6 grams of 50 percent aqueous solution of sodium hydroxide, 0.7 grams of hydroxylamine hydrochloride and a solution of 2.4 grams of methyl o-(3-chloropropionamido)benzoate in ethanol. The mixture was filtered and the filtrate was concentrated to remove the alcohol. The water solution was extracted with chloroform and the chloroform solution was concentrated by evaporation. The residue was recrystallized from ethyl ether-ethyl acetate to give 2,3-dihydro-9H-isoxazolo(3,2-b)quinazolin-9-one.

EXAMPLE III

Preparation of 7-chloro-2,3-dihydro-9H-isoxazolo(3,2-b)quinazolin-9-one

Following the procedure set forth in METHOD A, a suspension of 8.0 grams of the sodium salt of 3-isoxazolidin-one and 15.8 grams of 5-chloroisatoic anhydride in 150 ml. of dimethylformamide was stirred and heated at 80°–90° C. for two hours. The mixture was filtered and the filtrate evaporated to dryness. The residue was dissolved in chloroform and the chloroform solution was washed with water and dried. After evaporation of the solvent, the residue, 7-chloro-2,3-dihydro-9H-isoxazolo(3,2-b)quinazolin-9-one, was recrystallized from ethanol.

EXAMPLE IV

3-Methyl-2,3-dihydro-9H-isoxazolo(3,2-b)quinazolin-9-one was prepared following the procedure set forth in METHOD B above 600 ml. of aqueous solution containing 31.2 grams of sodium hydroxide was cooled at 0° C. and 27.2 grams of hydroxylamine hydrochloride was added. To the resulting solution, 49.3 grams of 3-chloroisobutyryl chloride was added dropwise with cooling and stirring. The mixture was stirred at room temperature for 2 hours. 32 grams of 50 percent aqueous solution of sodium hydroxide was added, and the mixture was then heated at 65° C. for one hour, allowed to cool to room temperature and treated with 40 grams of isatoic anhydride. Chloroform (200 ml.) was added and the mixture was stirred overnight. The two layers were separated and the aqueous layer was washed with chloroform. The chloroform solutions were combined, dried, and evaporated to dryness leaving 51 grams of an oil. The oil was treated with absolute ethanol containing hydrogen chloride gas and the solid was removed, treated with dilute ammonium hydroxide, and extracted into chloroform. The chloroform solution was washed with a saturated sodium chloride solution, dried, and evaporated to dryness giving 12 grams of 3-methyl-2,3-dihydro-9H-isoxazolo(3,2-b)quinazolin-9-one having a melting point of 143°–146° C.

EXAMPLE V

In accordance with the procedures outlined in METHOD D above, 3-methyl-2,3-dihydro-9H-isoxazolo(3,2-b)quinazolin-9-one was prepared as follows:

To a solution of 3.1 grams of o-aminobenzohydroxamic acid in 50 ml. of pyridine was added dropwise 2.8 grams of 3-chloroisobutyryl chloride and the solution was stirred at room temperature for 16 hours. The pyridine was removed in vacuo and the residue was treated with water and ether and the resulting mixture was adjusted to pH 4. The ether solution was separated, dried and evaporated to dryness. The residue was heated on a steam bath for one-half hour with an aqueous solution containing one equivalent of sodium hydroxide. The mixture was cooled and extracted with chloroform and the chloroform solution was dried and evaporated under reduced pressure. The solid residue was recrystallized from ethyl acetate giving 3-methyl-2,3-dihydro-9H-isoxazolo(3,2-b)quinazolin-9-one, melting point 143°–146° C.

EXAMPLE VI

In accordance with the procedures outlined in METHOD B above, 2-methyl-2,3-dihydro-9H-isoxazolo(3,2-b)quinazolin-9-one was prepared as follows:

Following the procedure described in Example IV employing 64 grams of 3-chlorobutyryl chloride and 60 grams of isatoic anhydride in lieu of the 49.3 grams of 3-chloroisobutyryl chloride and 40 grams of isatoic anhydride respectively, 29.3 grams of 2-methyl-2,3-dihydro-9H-isoxazolo(3,2-b)quinazolin-9-one was obtained.

The active compounds of the present invention can be used in the free base form or in the form of an acid addition salt thereof with a pharmacologically acceptable acid. As used herein the term "pharmacologically acceptable acids" shall mean organic and inorganic acids such as hydrochloric, phosphoric, sulfuric, citric, acetic, tartaric, and the like.

The following examples illustrate the preparation of acid addition salts useful in the present invention.

EXAMPLE VII

Preparation of 2,3-dihydro-9H-isoxazolo(3,2-b)quinazolin-9-one hydrochloride

A solution of 2,3-dihydro-9H-isoxazolo(3,2-b)quinazolin-9-one in methylene chloride was treated with dry hydrogen chloride. The solid thus formed was removed by filtration and recrystallized from ethanol to give 2,3-dihydro-9H-isoxazolo(3,2-b)quinazolin-9-one hydrochloride. The product which had a melting point of 195°–210° C. analyzed as follows:

|  | C | H | Cl | N |
|---|---|---|---|---|
| Calculated for $C_{10}H_9ClN_2O_2$: | 53.47 | 4.04 | 15.78 | 12.47 |
| Found: | 53.33 | 3.86 | 15.93 | 12.25 |

EXAMPLE VIII

Preparation of 2,3-dihydro-9H-isoxazolo(3,2-b)quinazolin-9-one phosphate

A solution of 6.2 grams of 2,3-dihydro-9H-isoxazolo(3,2-b)quinazolin-9-one in 300 ml. of isopropanol was heated and treated with 4 grams of 85 percent phosphoric acid. The mixture was filtered while hot and then cooled. Crystals were removed by filtration and recrystallized from isopropanol giving 6.6 grams of white glistening crystals as product. The product which had a melting point of 210°–213° C., analyzed as follows:

|  | C | H | N | P |
|---|---|---|---|---|
| Calculated for $C_{10}H_{11}N_2O_6P$: | 41.96 | 3.88 | 9.79 | 10.82 |
| Found: | 41.97 | 3.86 | 9.67 | 10.77 |

EXAMPLE IX 2,3-Dihydro-9H-isoxazolo(3,2-b)quinazolin-9-one sulfate was obtained by recrystallizing from ethanol the solid formed in a mixture of 2,3-dihydro-9H-isoxazolo(3,2-b)quinazolin-9-one and concentrated sulfuric acid. The 2,3-dihydro-9H-isoxazolo(3,2-b)quinazolin-9-one sulfate had a melting point of 213°–215° C. and analyzed as follows:

|  | C | H | N | S |
|---|---|---|---|---|
| Calculated for $C_{10}H_{10}N_2O_6S \cdot H_2O$: | 39.48 | 3.98 | 9.21 | 10.52 |
| Found: | 39.61 | 3.80 | 9.03 | 10.48 |

The product was dried in vacuo over phosphorus pentoxide at 100° C. The melting point was unchanged and product analysis was as follows:

|  | H | N | S |
|---|---|---|---|
| Calculated for $C_{10}H_{10}N_2O_6S$: | 41.94 | 3.52 | 9.79 | 11.29 |
| Found: | 41.14 | 3.60 | 9.83 | 11.03 |

(C column: Calcd. 41.94; Found 41.14)

EXAMPLE X

The tartrate of 2,3-dihydro-9H-isoxazolo(3,2-b)quinazolin-9-one was obtained as a solid formed in the mixture of 2,3-dihydro-9H-isoxazolo(3,2-b)quinazolin-9-one and tartaric acid in isopropanol. The solid 2,3-dihydro-9H-isoxazolo(3,2-b)quinazolin-9-one tartrate had a melting point of 162°–164° C. and the following analysis:

|  | C | H | N |
|---|---|---|---|
| Calculated for $C_{24}H_{22}N_4O_{10}$: | 54.76 | 4.21 | 10.64 |
| Found: | 54.66 | 5.52 | 10.40 |

Table I, which follows, sets forth the physical constants and analytical values of a number of compounds of the present invention prepared as described in the foregoing examples as well as additional compounds prepared by substantially similar procedures to those herein specifically described.

Previously undescribed intermediates used to prepare the 2,3-dihydro-9H-isoxazolo(3,2-b)quinazolin-9-ones in Table I were 5-methoxyisatoic anhydride and 5-chloro-4-methylisatoic anhydride. These intermediates were prepared according to the following procedures:

A. 5-Methoxyisatoic Anhydride 17.3 grams of 5-methoxyanthranilic acid (N.B. Smith et al., J. AM. CHEM. SOC., 68: 1301, 1946) was dissolved in a solution of 11 grams of sodium carbonate in 400 ml. of water and was treated with 12 ml. of phosgene. Solid was separated, washed with water and air dried. It weighed 17.2 grams and did not melt up to 280° C. This anhydride was used to prepare Compound 9 of Table I.

B. 5-Chloro-4-Methylisatoic Anhydride 10 grams of 4-methylisatoic anhydride in 300 ml. of acetic acid was treated with 10 grams of sulfuryl chloride. The mixture was heated at about 60° C for several hours. Solid was removed by filtration, washed with water, and air dried. The solid weighed 11.3 grams and melted with decomposition at 288°–289° C. and analyzed as follows:

|  | C | H | Cl | N |
|---|---|---|---|---|
| Calculated for $C_9H_6ClNO_3$: | 51.08 | 2.86 | 16.75 | 6.62 |
| Found: | 50.89 | 2.86 | 16.60 | 6.59 |

This anhydride was used to prepare Compound 10 of

TABLE I

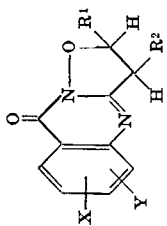

| Compound No. | X | Y | $R^1$ | $R^2$ | Method | Recryst. solvent | M.P., °C. | Formula | Carbon Calcd. | Carbon Found | Hydrogen Calcd. | Hydrogen Found | Nitrogen Calcd. | Nitrogen Found | Other elements Calcd. | Other elements Found |
|---|---|---|---|---|---|---|---|---|---|---|---|---|---|---|---|---|
| 1 | H | H | H | H | A, B, C | Xylene or Et₂O–EtOAc | 153–154 | $C_{10}H_8N_2O_2$ | 63.82 | 63.69 | 4.29 | 4.16 | 14.89 | 14.65 | ᵃ17.00 | ᵃ17.10 |
| 2 | 7-Cl | H | H | H | A | EtOH | 211–218 | $C_{10}H_7ClN_2O_2$ | 53.95 | 53.77 | 3.16 | 3.00 | 12.58 | 12.36 | ᵇ15.92 | ᵇ15.78 |
| 3 | 5-Cl | 7-Cl | H | H | A | Xylene | 199–201 | $C_{10}H_6Cl_2N_2O_4$ | 46.69 | 46.78 | 2.34 | 2.28 | 10.89 | 10.78 | ᵇ27.63 | ᵇ27.52 |
| 4 | H | H | H | CH₃ | A | EtOAc | 143–146 | $C_{11}H_{10}N_2O_2$ | 65.33 | 65.26 | 4.98 | 4.97 | 13.86 | 13.74 | ᵃ15.83 | ᵃ15.93 |
| 5 | 7-CH₃ | H | CH₃ | H | B, C, D | EtOAc | 214–215.5 | $C_{11}H_{10}N_2O_2$ | 65.33 | 65.46 | 4.98 | 5.08 | 13.86 | 13.70 |  |  |
| 6 | H | H | H | H | A, B | Et₂O–CH₃CN | 148–150 | $C_{11}H_{10}N_2O_2$ | 65.33 | 65.51 | 4.98 | 5.02 | 13.86 | 13.82 | ᵇ15.83 | ᵇ15.97 |
| 7 | 6-Cl | H | H | H | B | THF | 226–228 | $C_{10}H_7ClN_2O_2$ | 53.95 | 53.72 | 3.16 | 3.09 | 12.58 | 12.30 | ᵇ15.92 | ᵇ15.83 |
| 8 | 6-Cl | 7-H₂NSO₂ | H | H | A | EtOH | 273–274 | $C_{10}H_8ClN_3O_4S$ | 39.80 | 39.94 | 2.65 | 2.76 | 13.93 | 13.82 | ᵇ11.81 | ᵇ11.77 |
| 9 | 7-OCH₃ | H | H | H | A, B | EtOH | 190–195 | $C_{11}H_{10}N_2O_3$ | 60.54 | 60.28 | 4.62 | 4.52 | 12.84 | 12.62 | ᵃ22.00 | ᵃ21.73 |
| 10 | 7-Cl | 6-CH₃ | H | H | A | EtOH | 213–216 | $C_{11}H_9ClN_2O_2$ | 55.83 | 55.63 | 3.83 | 3.75 | 11.84 | 11.64 | ᵇ14.98 | ᵇ15.05 |

ᵃ Oxygen. ᵇ Chlorine.

One or a mixture of the compounds of the present invention in their free form or as their pharmacologically acceptable acid addition salts can be administered to warm-blooded animals in a variety of unit dosage forms, such as tablets, capsules or injectable solutions. In general, the compounds of the present invention are incorporated with suitable liquid or solid pharmaceutical carriers such as water, propylene glycol, polyethylene glycol, saline, acacia starch, glucose, lactose, sucrose, gelatin, mixtures thereof and the like to form unit dosage forms suitable for administration by injection or for oral administration.

The compounds of the present invention exhibit useful and valuable anti-inflammatory activity as evidenced by their ability to inhibit the local edema formation characteristics of inflammatory states when administered systemically to standard test animals.

In order to establish the effectiveness of the compounds of the present invention in hind paw edema induced by carrageenin in the rat, the procedure (Winters et al., PROC. SOC. EXP. BIOL. MED., Vol. III, page 544, 1962) described below was used. This procedure is considered suitable for demonstrating anti-inflammatory activity of drug compounds in laboratory animals.

Male rats of the Sprague-Dawley strain (Charles River Laboratories) weighing 100 ± 20 grams were used for this study.

Six animals were used for each drug dose. The drugs were suspended in 1 percent aqueous solution of gum acacia, and each rat received 10 ml/kg of the appropriate concentration of drug suspension by oral intubation; controls were given a similar volume of the vehicle. One hour later, edema in the right hind paw was induced by the subplantar injection of 0.05 ml. of 1 percent calcium carrageenin dissolved in 0.15N sodium chloride. The volume of the foot was determined by immersion of the foot in water at the level of the lateral malleolus, and determining the volume of water displaced by the foot. The foot volume was determined immediately after carrageenin injection and again 3 hours later. The difference was recorded as edema volume. The $ED_{50}$ may be defined as the dose in which edema formation is inhibited by 25 percent or more in 50 percent of the rats when compared to the mean value of the controls.

Table II which follows illustrates the anti-inflammatory activity of representative compounds of the present invention.

TABLE II

| Compound No. (From Table I) | $ED_{50}$ ± S.E. mg/kg |
|---|---|
| 1 | 6 |
| 2 | 30 |
| 3 | 100 |
| 4 | 19 |
| 5 | 100 |
| 6 | 12 |
| 7 | 40 |
| 8 | 300 |
| 9 | 100 |
| 10 | 70 |

The antipyretic activity of the compounds of the present invention was determined according to a modification of the method of Smith and Hambourger (J.PHARM. EXP. THER. Vol. 54, pages 345–351, 1935).

Fever was induced in two groups of male adult Charles River rats by subcutaneous injection of 1 ml/100 grams of a 15 percent Brewer's yeast suspension in 2 percent acacia. One of the fevered groups received oral administration of the drug in the dosages indicated in Table III. A third group of rats acted as a nonfevered control group.

The antipyretic activity of the compounds was observed at 0, 2 and 4 hours. Table III which follows gives the results of a typical experiment using 2, 3-dihydro-9H-isoxazolo(3,2-b)quinazolin-9-one as the antipyretic agent.

TABLE III
(Mean Temperature)

| Group | Temperature | | |
|---|---|---|---|
| | 0-hour °F.[a] | 2-hour °F. | 4-hour °F. |
| I. Control (fevered) | 102.3±0.2 | 102.0±0.2 | 102.0±0.2 |
| II. Treated with 2,3-dihydro-9H-isoxazolo(3,2-b)quinazolin-9-one: | | | |
| 12 mg./kg | 102.3±0.2 | 98.3±0.3 | 99.2±0.2 |
| 6 mg./kg | 102.3±0.2 | 100.4±0.2 | 100.6±0.2 |
| 3 mg./kg | 102.2±0.2 | 101.6±0.4 | 101.4±0.4 |
| III. Control (nonfevered) | 98.3±0.2 | 98.6±0.3 | 98.8±0.2 |

[a] Base temperature.

The diuretic activity of 2,3-dihydro-9H-isoxazolo(3,2-b)quinazolin-9-one was also determined using the method essentially described by Cummings et al., J. PHARM. EXP. THER. Vol. 128, page 414, 1960.

Groups of 10 non-fasted, non-waterloaded, male Charles River rats weighing 120–150 grams were each treated with a single intraperitoneal injection of 2,3-dihydro-9H-isoxazolo(3,2-b)quinazolin-9-one suspended in fresh 5 percent gum acacia. Concentration of the tested compound was adjusted to provide the desired dose in a volume of 1.0 ml/100 grams of body weight.

Immediately after inoculation, the rats were caged in pairs without food or water and metabolism bottoms were fitted to the cages. Commencing with the caging of the test animals, urine was collected for a period of 6 hours. At the end of this time the urine that remained in the bladder of each rat was manually expressed by suprapubic pressure. Samples were analyzed in duplicate for chloride concentration, and the total microequivalents of chloride excreted were calculated for each cage. Data was compiled to determine group 6-hour mean values and standard errors. The results of this compilation and determination are shown in Table IV.

TABLE IV

| Drug | Dosage mg/kg | Urine Output ml/rat | Chloride Excreation Total microeq. |
|---|---|---|---|
| None (controls) | — | 1.95 ± 0.3 | 289.3 ± 54.1 |
| 2,3-dihydro-9H-isoxazolo(3,2-b)quinazolin-9-one | 100 | 5.85 ± 0.6 | 543.8 ± 50.4 |

The foregoing examples and tables have been illustrative of the invention only and are not to be considered as placing any limitation on the invention. It is recognized that various departures may be made therefrom within the scope of the accompanying claims without departing from the principles of the invention.

What is claimed is:

1. A compound of the formula:

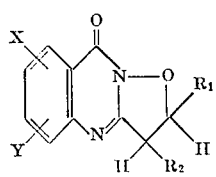

wherein X and Y are each a member selected from the group consisting of hydrogen, halogen, lower alkyl, lower alkoxy and sulfonamido; and $R_1$ and $R_2$ are each a member selected from the group consisting of hydrogen and lower alkyl; and the physiologically acceptable acid addition salts thereof.

2. A compound of claim 1 wherein X is halogen and Y, $R_1$ and $R_2$ are hydrogen.

3. A compound of claim 1 wherein X and Y are halogen and $R_1$ and $R_2$ are hydrogen.

4. A compound of claim 1 wherein X, Y and $R_1$ are hydrogen and $R_2$ is alkyl.

5. A compound of claim 1 wherein X is alkyl and $R_1$, $R_2$ and Y are hydrogen.

6. A compound of claim 1 wherein X, Y, and $R_2$ are hydrogen and $R_1$ is alkyl.

7. A compound of claim 1 wherein X is alkoxy and Y, $R_1$ and $R_2$ are hydrogen.

8. A compound of claim 1 wherein X is halogen, Y is alkyl and $R_1$ and $R_2$ are hydrogen.

9. A compound of claim 1 wherein X is halogen, Y is sulfonamido and $R_1$ and $R_2$ are hydrogen.

10. 2,3-Dihydro-9H-isoxazolo(3,2-b)quinazolin-9-one.

11. 7-Chloro-2,3-dihydro-9H-isoxazolo(3,2-b)quinazolin-9-one.

12. 6-Chloro-2,3-dihydro-9H-isoxazolo(3,2-b)quinazolin-9-one.

13. 5,7-Dichloro-2,3-dihydro-9H-isoxazolo(3,2-b)quinazolin-9-one.

14. 3-Methyl-2,3-dihydro-9H-isoxazolo(3,2-b)quinazolin-9-one.

15. 7-Methyl-2,3-dihydro-9H-isoxazolo(3,2-b)quinazolin-9-one.

16. 2-Methyl-2,3-dihydro-9H-isoxazolo(3,2-b)quinazolin-9-one.

17. 7-Methoxy-2,3-dihydro-9H-isoxazolo(3,2-b)quinazolin-9-one.

18. 7-Chloro-6-methyl-2,3-dihydro-9H-isoxazolo(3,2-b)quinazolin-9-one.

19. 6-Chloro-7-sulfamyl-2,3-dihydro-9H-isoxazolo(3,2-b)quinazolin-9-one.

* * * * *